United States Patent
Schmidt

(10) Patent No.: US 6,828,504 B1
(45) Date of Patent: Dec. 7, 2004

(54) GROUNDING DEVICE

(75) Inventor: Frederick Schmidt, Frankfort, IL (US)

(73) Assignee: Beverly Manufacturing Company, Tinley Park, IL (US)

( * ) Notice: Subject to any disclaimer, the term of this patent is extended or adjusted under 35 U.S.C. 154(b) by 0 days.

(21) Appl. No.: 10/682,216

(22) Filed: Oct. 9, 2003

(51) Int. Cl.[7] .................................................. H02G 15/02
(52) U.S. Cl. ...................................... 174/75 C; 174/78
(58) Field of Search ............................... 174/75 C, 78, 174/74 R, 40 CC; 439/800

(56) References Cited

U.S. PATENT DOCUMENTS

| | | | | |
|---|---|---|---|---|
| 3,370,122 A | * | 2/1968 | Ichikawa | 174/78 |
| 4,346,428 A | * | 8/1982 | Gale | 361/215 |
| 4,477,865 A | | 10/1984 | Tsuyama | 362/396 |
| 5,281,761 A | | 1/1994 | Woo et al. | 174/78 |
| 5,850,056 A | | 12/1998 | Harwath | 174/40 |
| 5,928,007 A | | 7/1999 | Lundbäck | 439/92 |
| 6,011,218 A | | 1/2000 | Burek et al. | 174/40 |
| 6,297,447 B1 | | 10/2001 | Burnett et al. | 174/40 |
| 6,534,714 B2 | * | 3/2003 | Daume | 174/78 |
| 6,548,762 B2 | | 4/2003 | Jiles et al. | 174/78 |

* cited by examiner

*Primary Examiner*—Chau N. Nguyen
(74) *Attorney, Agent, or Firm*—Barnes & Thornburg; Timothy J. Engling

(57) ABSTRACT

A ground device having a C-shaped clip that is connected to a grounding wire. The clip includes a band of metal that secures resilient clip sides of the clip in locking engagement around the cable. A distal end of a clip side has a lip that is adapted for the band of metal is shorter than an axial opening between the resilient clip sides when the clip sides are in an unstressed condition.

9 Claims, 2 Drawing Sheets

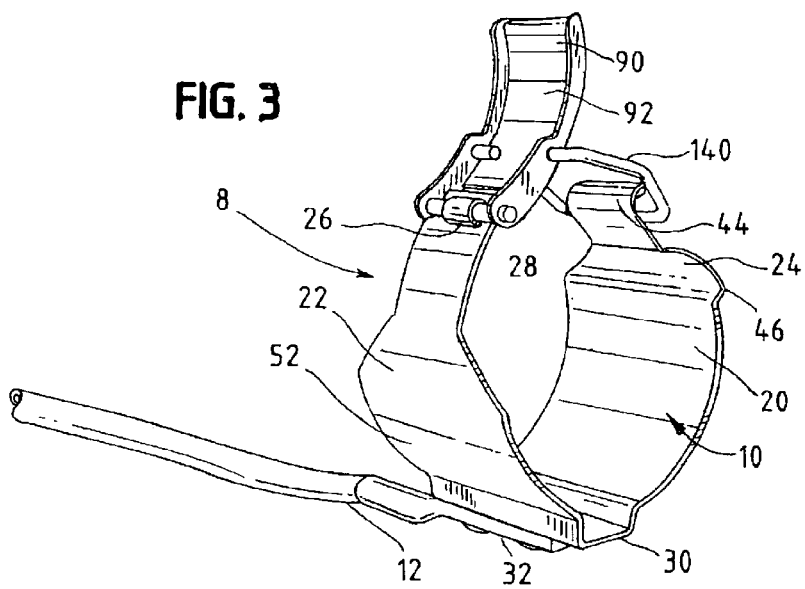
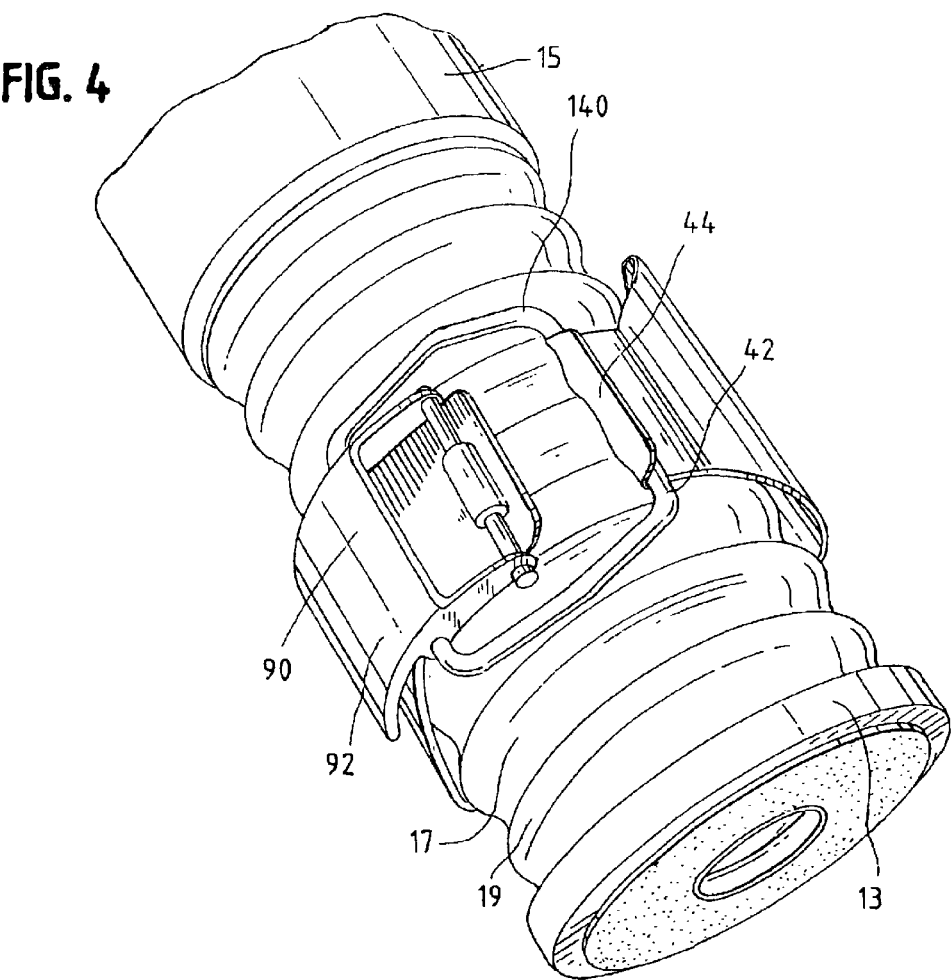

GROUNDING DEVICE

BACKGROUND

The present disclosure relates to a grounding device for a cable. More particularly, the disclosure relates to a grounding device having a clip that is connected to a grounding wire, wherein the clip includes a band of metal that secures the two sides of the clip in locking engagement around the cable.

Grounding is often used with cable to place the cable at zero potential with the earth. Grounding minimizes the potential damage that may occur when the cable is subjected to extreme current conditions, such as lightning or other current surges. A grounding device is a conducting connection to transmit or divert transient electric currents to the ground to prevent damage to the cable or related equipment. The grounding wire is connected directly or indirectly to the ground. A grounding device may be used with cable having a portion of its outer jacket removed to reveal an exposed section of its conductor. The clip of the grounding device engages an exposed section of the conductor.

Tapes can seal the conductor after the grounding device is attached. The clip on the exposed conductor is often sealed with a sealant and a tape so the conductor of the cable is protected from the environment. Often, multiple types of tape are used for the sealing procedure, and a simple two-part weatherproofing system may include a butyl strip followed by vinyl electrical tape. Other housings and encasing devices are known as weatherproofing systems for the grounding connection.

U.S. Pat. No. 5,850,056 is a grounding kit for a transmission line cable, which is incorporated herein by reference. The grounding kit includes a clip, a bail and a housing. The clip has a fulcrum portion and means for connecting the clip to a ground wire. The clip encompasses a part of the exposed section of the conductor. The bail includes a mounting element pivotably mounted on the fulcrum portion of the clip to permit rotation of the bail between an open position and a closed position. The handle contacts the clip and forces the clip into clamping engagement with the exposed section of the conductor in response to the bail being rotated to the closed position.

SUMMARY

The invention may be described as grounding device with a grounding wire attached to a clip having the clip sides resiliently biased with an axial opening in an unstressed condition that is greater than the size of the metal band that secures the clip sides together around a conductor of a cable. The clip remaining securely attached to the conductor of the cable maintains contact between the conductor and the grounding wire.

In one embodiment, the grounding device includes a clip having a band of metal that secures the clip sides of the clip in locking engagement after the clip sides are squeezed together. The metal band is pivotably mounted on a distal end of a clip side of the grounding device, and the metal band is shorter than the axial opening between the clip sides until pressure is applied to squeeze the clip sides together. The metal band can be secured to the other clip side by engaging a lip on the opposing clip side. The C-shaped clip is larger than the circumference of the cable that it will engage, and the spring in the material itself makes the clip resilient so the clip will return to its original unstressed position. In order to operate the clip, the two clip sides must be squeezed together, and the metal band must be rotated over the lip on the opposing clip side once the clip sides are squeezed together. The rotation of the metal band does not place the clip in the closed position. Rather the clip sides must be squeezed together, the metal band must be attached to the lip, and the pressure is released from the two clip sides. The clip can be secured using one hand with the thumb pushing in the middle of the fulcrum before rotating the metal band.

In an alternate embodiment, the grounding device has a clip that includes a buckle having a tongue with a metal band attached. A metal band is pivotally attached to the tongue, which is attached to a distal end on a fulcrum portion of the clip. The opposite distal end includes a lip that the metal band engages to secure the clip sides together around a cable. The buckle minimizes squeezing of the clip sides together, but the metal band still engages the lip and the buckle secures the clip sides together when the tongue is rotated and buckled down with the metal band engaging the lip on the opposing clip side.

The present grounding device is distinct from U.S. Pat. No. 5,850,056 because it does not include a bail that forces a clip into clamping engagement in response to the bail being rotated to a closed position. The flipping of the metal band does not force the clip sides together or complete the engagement. The metal band of the present clip is shorter than the axial opening between the clip sides until the tongue of the buckle is rotated toward the opposing clip side or until pressure is applied to squeeze the clip sides together when the metal band can be flipped. Without rotating the buckle or applying pressure on both sides of the clip, the metal band could not engage the lip on the opposing clip side. Until pressure is applied or the tongue of the buckle is rotated toward the opposing clip side, the metal band is not long enough to engage the opposing clip side.

Force can be applied by the user's hand to force the clip sides together after which the metal band is rotated and attached to the lip to maintain the resilient clip sides together. The attachment of the metal band onto the lip of the opposing clip side holds the clip sides together after the force from the user's hand is released. The engagement of the first grounding device is caused by squeezing the clip sides together, engaging the metal band on the lip, and releasing pressure rather than merely rotating the bail. The engagement of the second grounding device is caused by buckling the buckle closed. The buckling may provide the force to bring the clip sides together.

BRIEF DESCRIPTION OF THE DRAWINGS

The features of this invention and the manner of obtaining them will become more apparent, and the invention itself will be best understood by reference to the following description of embodiments of the grounding device taken in conjunction with the accompanying drawings in which:

FIG. 3 is a perspective view of a second embodiment of a grounding device including a buckle; and FIG. 4 is a perspective view of the second embodiment of a grounding device engaging a conductor of a cable.

DETAILED DESCRIPTION

While the present invention will be described fully hereinafter with reference to the accompanying drawings, in which particular embodiments are shown, it is to be understood at the outset that persons skilled in the art may modify the embodiments disclosed herein while still achieving the desired result. Accordingly, the description that follows is to be understood as a broad informative disclosure directed to persons skilled in the appropriate art and not as limitations of the present invention.

Figure 1:
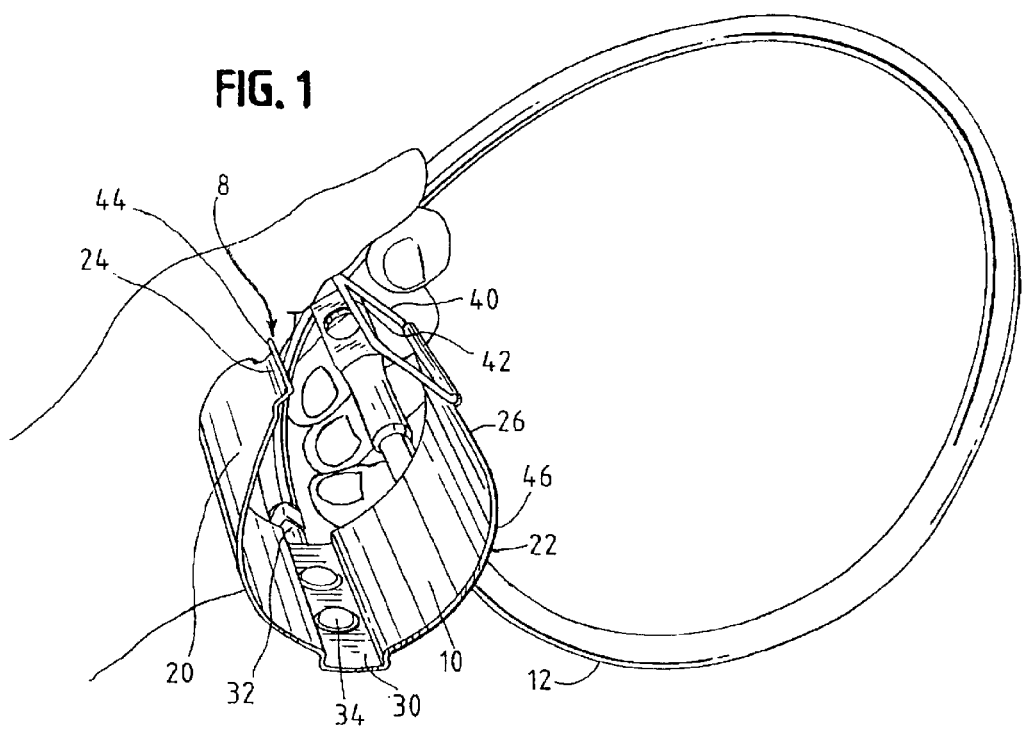
FIG. 1 is a perspective view of an embodiment of a grounding device for a cable.
Figure 2:
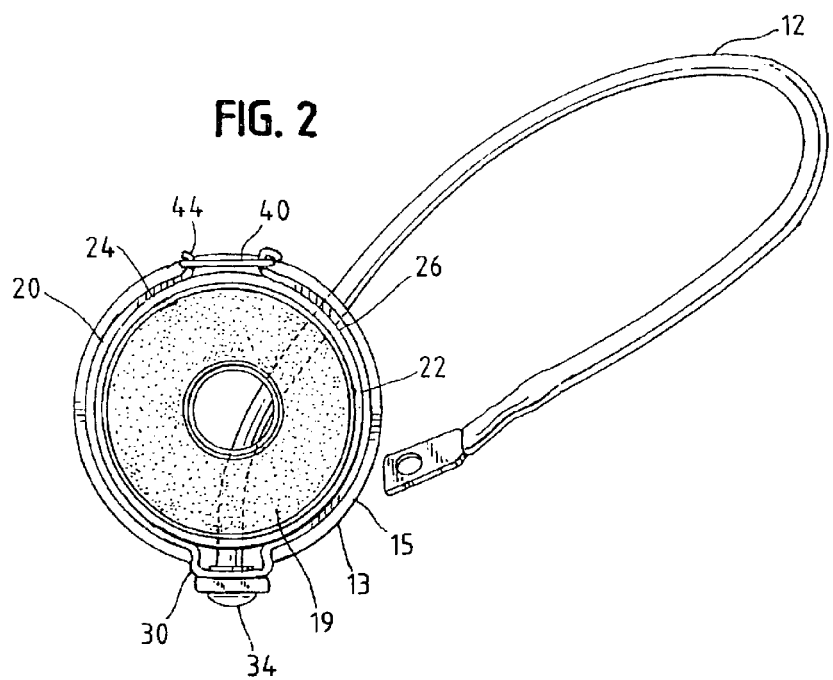
FIG. 2 is a cross sectional view of the clip secured to a cable.

In the Figures, like reference numerals indicate the same element throughout. FIG. 1 shows a grounding device 8 with a clip 10 coupled to a grounding wire 12. The clip 10 is preferably made of copper, and the grounding wire 12 preferable includes a seven-strand plastic-coated grounding conductor. The grounding wire 12 may be connected directly or indirectly to the ground. A tin-plated copper grounding lug with one or more apertures in the lug can be factory-attached to the grounding conductor at the end of the grounding wire 12.

The clip 10, which is substantially C-shaped, attaches to and surrounds a cable 13, such as one having a portion of its outer jacket 15 removed to reveal an exposed section 17 of its conductor 19. The clip 10 engages the exposed section 17 of the conductor 19.

The clip 10 includes two clip sides 20 and 22 with distal ends 24 and 26 respectively. The distal ends 24 and 26 define an axial opening 28 therebetween through which the cable 13 is inserted. An electrical conductor 19 of the cable 13 can easily pass through the axial opening 28 between the clip sides 20 and 22 of the clip 10 because the clip sides 20 and 22 are resiliently spaced apart.

Opposite the axial opening 28 is the attachment portion 30, which is the surface of the clip 10 to which the grounding wire 12 is coupled. Ideally, the attachment portion 30 is recessed from the clip sides 20 and 22. The grounding wire 12 has a conductive end 32 that is attached to the attachment portion 30 of the clip 10. The conductive end 32 is fastened to the attachment portion 30 with a conductive medium, such as multiple copper rivets 34. Direct attachment such as brazing remains possible, but as a result of extreme current conditions, the solder may not hold the clip 10 to the grounding wire 12. Multiple rivets 34 have proven to keep the grounding device 8 functional and intact.

A metal band 40 is designed to secure the clip sides 20 and 22 of the clip 10 in locking engagement after the clip sides 20 and 22 are squeezed together. A metal band 40 is pivotally attached to a distal end 26 and the opposite distal end 24 includes a lip 44. The rotation of the metal band 40 onto the lip 44 of the opposing distal end 24 holds the clip sides 20 and 22 together after the force from the user's hand is released. The engagement portion 42 of the metal band 40 engages the lip 44, which is narrower than the engagement portion 42. The metal band 40 may preferably be planar or also arched to follow the circumference of the cable 13.

In another related embodiment, each clip side 20 and 22 of the clip 10 extends substantially above the cable 13, which is used primarily for smaller diameter cables that make the clip 10 harder to push together. Also, on at least one side of a clip side 20 or 22, there is preferably a bend line 46 across the upper portion to assist in the resilient springing action.

In an alternate embodiment, the clip 10 includes a buckle 90 having a tongue 92 with a metal band 140 attached. A metal band 140 is pivotally attached to the tongue 92, preferably about a third of distance from the attachment end of the tongue 92. The tongue 92 is pivotally attached to a distal end 26 of the clip side 22. The tongue 92 is attached to fulcrum portion of a clip side 22. The opposite distal end 24 includes a lip 44 that the metal band 140 engages to secure the clip sides 20 and 22 together around a cable 13. The buckle 90 being pivotally attached to distal end 26 allows the entire metal band 140 to move closer to the lip 44 for easier engagement. Although slight squeezing is acceptable, the buckling action supplies pressure to bring the clip sides 20 and 22 together to be secured around cable 13.

The buckle embodiment of the grounding device 8 may have a clip side 22 with a distal end 26 that is narrower than the base 52 to allow the metal band 140 to pass outside the distal end 26 when the grounding device 8 is buckled closed. The metal band 140 of this embodiment is preferably bent to have the general inclination of the conductor 19, but the metal band 140 may be curved to follow the shape of the conductor 19 or even planar.

Although preferred embodiments of the disclosure are illustrated and described in connection with particular features, they can be adapted for use with a variety of grounding devices, metal bands, and materials. Other embodiments and equivalent grounding devices are envisioned within the scope of the claims. Various features of the disclosure have been particularly shown and described in connection with the illustrated embodiments, however, it must be understood that the particular embodiments merely illustrate and that the invention is to be given its fullest interpretation within the terms of the appended claims.

What is claimed is:

1. A grounding device for grounding a cable comprising:
   a grounding wire;
   a substantially C-shaped clip that is connected to the grounding wire, the clip including a first and a second resilient clip side and a pivotably attached band of metal that is adapted to secure the resilient clip sides in locking engagement around the cable; a first distal end of the first resilient clip side having a lip that is adapted for the band of metal to clasp, the band of metal being shorter than an axial opening between the first and the second resilient clip sides in an unstressed condition when pressure is not applied to squeeze the first and the second resilient clip sides together.

2. The grounding device of claim 1 wherein the band of metal is pivotally attached to a second distal end of the second resilient clip side.

3. The grounding device of claim 2 wherein the band of metal is planar.

4. A grounding device for grounding a cable comprising:
   a grounding wire;
   a substantially C-shaped clip that is connected to the grounding wire, the clip including a first and a second resilient clip side and a band of metal that is adapted to secure the resilient din sides in locking engagement around the cable; a first distal end of the first resilient clip side having a lip that is adapted for the band of metal to engage, a buckle including a tongue wherein the band of metal is pivotally attached to the tongue of the buckle, the tongue being pivotally attached to a second distal end of the second resilient clip side, the band of metal being shorter than an axial opening between the first and the second resilient clip sides in an unstressed condition when pressure is not applied to squeeze the first and the second resilient clip sides together.

5. The grounding device of claim 4 wherein the second distal end is narrower than at a base of the second resilient clip side to allow the band of metal to pass outside the second distal end when the grounding device is buckled around the cable.

6. The grounding device of claim 4 wherein the band of metal is bent to have an inclination of the cable.

7. The grounding device of claim 4 wherein the band of metal is curved to follow a curve of the cable.

8. The grounding device of claim 1 further comprising a bend line across an upper portion of the first resilient clip side.

9. A grounding device for grounding a cable comprising:

a grounding wire;

a substantially C-shaped clip having a recessed attachment portion wherein the grounding wire is riveted to the recessed attachment portion, the clip including a first and a second resilient clip side and a band of metal forming a portion of a ring in the form of a clasp that is adapted to secure the resilient clip sides in locking engagement around the cable; a first distal end of the first resilient clip side having a lip that is adapted for the band of metal to clasp, the band of metal is pivotally attached to a second distal end of the second resilient clip side, the band of metal being shorter than an axial opening between the first and the second resilient clip sides in an unstressed condition when pressure is not applied to squeeze the first and the second resilient clip sides together.

\* \* \* \* \*

UNITED STATES PATENT AND TRADEMARK OFFICE
CERTIFICATE OF CORRECTION

PATENT NO. : 6,828,504 B1
DATED : December 7, 2004
INVENTOR(S) : Frederick Schmidt It is certified that error appears in the above-identified patent and that said Letters Patent is hereby corrected as shown below:

<u>Column 4,</u>
Line 51, the word "din" should read -- clip --.

Signed and Sealed this

Fifteenth Day of February, 2005

JON W. DUDAS
*Director of the United States Patent and Trademark Office*